US009041817B2

(12) United States Patent
Lin et al.

(10) Patent No.: US 9,041,817 B2
(45) Date of Patent: May 26, 2015

(54) METHOD AND APPARATUS FOR RASTER OUTPUT OF ROTATED INTERPOLATED PIXELS OPTIMIZED FOR DIGITAL IMAGE STABILIZATION

(75) Inventors: ChinCheng Lin, San Jose, CA (US); Yongjian Zhou, San Jose, CA (US)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 545 days.

(21) Appl. No.: 13/313,860

(22) Filed: Dec. 7, 2011

(65) Prior Publication Data

US 2012/0162475 A1 Jun. 28, 2012

Related U.S. Application Data

(60) Provisional application No. 61/426,970, filed on Dec. 23, 2010, provisional application No. 61/426,975, filed on Dec. 23, 2010.

(51) Int. Cl.
| | |
|---|---|
| *H04N 5/228* | (2006.01) |
| *H04N 5/14* | (2006.01) |
| *H04N 5/232* | (2006.01) |
| *G06T 7/20* | (2006.01) |

(52) U.S. Cl.
CPC ............ *H04N 5/145* (2013.01); *H04N 5/23254* (2013.01); *G06T 7/2026* (2013.01); *G06T 7/2033* (2013.01); *G06T 7/2073* (2013.01); *G06T 2207/10016* (2013.01); *G06T 2207/20016* (2013.01); *G06T 2207/20021* (2013.01)

(58) Field of Classification Search
CPC ..................................................... H04N 1/2112

USPC ........................................................ 348/231.9
See application file for complete search history.

(56) References Cited

U.S. PATENT DOCUMENTS

| | | | |
|---|---|---|---|
| 7,165,133 B2 | 1/2007 | Takeuchi et al. | |
| 2002/0048410 A1* | 4/2002 | So et al. ......................... | 382/248 |
| 2003/0081858 A1* | 5/2003 | Rathnam et al. ............... | 382/298 |
| 2005/0105738 A1 | 5/2005 | Hashimoto | |
| 2005/0172294 A1 | 8/2005 | Kanemura et al. | |
| 2006/0274834 A1 | 12/2006 | Hahn et al. | |
| 2007/0061661 A1 | 3/2007 | Ries et al. | |
| 2007/0076796 A1* | 4/2007 | Shi et al. .................. | 375/240.16 |
| 2008/0052534 A1 | 2/2008 | Harada et al. | |
| 2008/0107307 A1 | 5/2008 | Altherr | |
| 2008/0165852 A1 | 7/2008 | Zhang | |
| 2010/0005264 A1 | 1/2010 | Ito et al. | |
| 2013/0036426 A1 | 2/2013 | Igura | |

* cited by examiner

*Primary Examiner* — Roberto Velez
*Assistant Examiner* — Stephen Coleman
(74) *Attorney, Agent, or Firm* — F. Chau & Associates, LLC

(57) ABSTRACT

A Digital Image Stabilization apparatus and method applies a Principal transform including a rotational motion component to a source frame and interpolates and outputs the image data of each pixel of an entire row of the destination frame in raster order. A first step identification the diagonally oriented meta-rows of source frame data that correspond to the pixels of an entire row of the destination frame, based on the principal transform coefficients. A second step is to horizontalize the source frame data of the meta-rows that correspond to the pixels of an entire row of the destination frame, by storing each meta-row of source frame data into one row of a memory buffer, such as a multi-line buffer. Then, a moving-window interpolation step sequentially interpolates based on the principal transform coefficients and outputs the image data of an entire row of the destination frame in raster order.

15 Claims, 16 Drawing Sheets

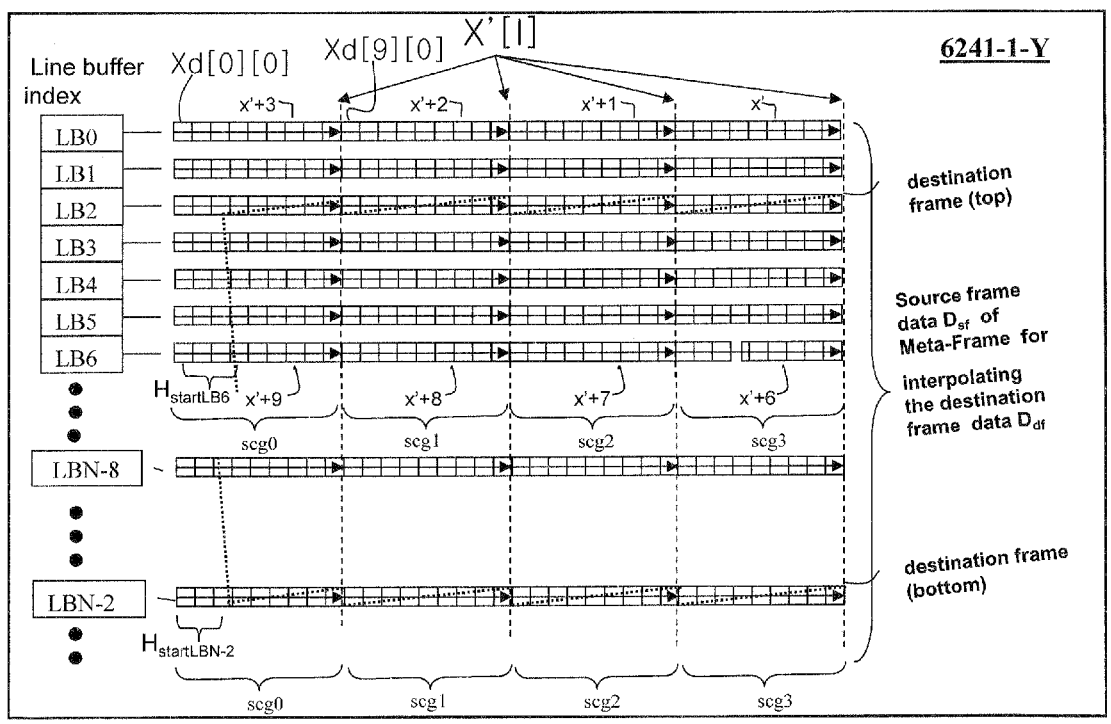
FIG. 6 Source image data saved into the line buffers

US 9,041,817 B2

METHOD AND APPARATUS FOR RASTER OUTPUT OF ROTATED INTERPOLATED PIXELS OPTIMIZED FOR DIGITAL IMAGE STABILIZATION

CROSS-REFERENCE TO RELATED APPLICATION

This application claims priority under 35 U.S.C. §120 to U.S. Provisional Application No. 61/426,970, and 61/426,975, both filed in the U.S. Patent and Trademark Office on Dec. 23, 2010. The disclosures of both provisional applications are incorporated by reference herein.

TECHNICAL FIELD

The present inventive concept relates to digital image-stabilization (DIS), and more particularly, to a method of rotating a destination frame portion of a source frame based on windowing interpolation of the pixels in a horizontal row of a destination meta-frame and outputting the interpolated pixels of the destination frame in raster order.

DISCUSSION OF THE RELATED ART

Digital cameras, digital video cameras and hand-held devices including such cameras capture are often employed to capture images or video while the camera is operated in the hand of a human operator. Thus, the video camera may be shaking or jittering in the operators hand while capturing the image or video. The jitter may include a horizontal component, a vertical component, and a rotational component. The jitter may make the hand-captured video distracting or disorienting for the viewer, and this it is desirable to use digital circuits to digitally estimate camera trajectory (i.e., the jitter as detected between each pair of consecutive frames) and to remove the jitter from a sequence of video frames of the same scene.

The video produced by a steady, either stationary or moving video camera contains mainly smooth motions (translation, rotation) in the captured video. On the other hand, an unsteady video camera produces video with high frequency jitter (translational and/or rotational) throughout the video images.

A digital image stabilization (DIS) system first estimates unwanted (unintended) motion and then applies corrections (compensation) to each of the frames in the image sequence. The visual effect of a stabilized video is highly dependent on the quality of camera trajectory estimation. The global motion of the camera/scene is analyzed to distinguish between intended (e.g., panning) and unintended (jittery) global motion.

In mathematics, affine geometry is the study of geometric properties which remain unchanged by affine transformations, i.e. non-singular linear transformations and translations. A mathematical system of equations defined by numerical coefficients, called an Affine matrix, has been developed to characterize the horizontal, vertical, rotational, and scalar (e.g., zoom in or zoom out) of movement detected between each pair of consecutive frames or between portions thereof (e.g., moving objects in the frames). The affine transform equation is $$x' = sx \cdot x + ry \cdot y + tx$$

$$y' = rx \cdot x + sy \cdot y + ty$$

Where (x, y) are destination frame pixel location, (x', y') are the calculated source frame pixel location after affine transform.

sx, ry, rx, sy, tx and ty are the affine transform coefficients.

This mathematical description of the group can contain linear displacement, rotation angle, scale, etc of the scene.

The camera jitter may be characterized by a first Affine transform matrix P(n) related to any actually-stationary objects (e.g., rocks, tables, parked cars, mountains, the sun) in the scene, called a Principal transform P(n), or Global Transform, while any moving objects (e.g., birds, people, balls, moving cars, passing trains) in the frame may be characterized by additional Affine matrices $T_i(n)$. Thus, the Principal transform P(n) may serve as a compact description of the motion of the background in the frame. Transforms with small motion are more likely to be the principle transform P(n).

Once the Principal transform P(n) is obtained, it is applied to the source frame of captured image data, and thus a corrected destination frame is obtained. When the Principal transform P(n) contains a rotational component, source frame data within the same row of the destination frame might come from many different lines of source frame.

The source frame pixel location identified to correspond with a particular destination frame pixel location may not coincide exactly with the center of an existing pixel in the source frame. The source frame pixel location identified to correspond with a particular destination frame pixel location may even be located equidistant between two or four adjacent pixels of the source frame. Thus, none of those adjacent pixels will individually have the same brightness and color as the corresponding destination frame pixel, but their average will. When rotational motion is present, then many or most pixels of the destination frame will not coincide exactly with whole pixels in the source frame. In such cases, it is necessary to interpolate each pixel of the destination frame image data $D_{df}$ from the image data $D_{sf}$ of a plurality of adjacent pixels of the source frame. This interpolation is performed using affine transform matrix based on the affine transform coefficients sx, ry, rx, sy, tx and ty. However, because of the angle of rotation of the destination frame relative to the source frame, the source frame data of pixels within any given row $R_d$ of the destination frame may come from different rows of the source frame. For example, if the angle of rotation is ±45 degrees, then the source frame data of pixels within the middle row $R_d$ of the destination frame may come from a range of source frame rows spanning most of the vertical dimension of the source frame. Thus, one approach to outputting a destination frame is to divide the source frame into tiles (blocks) and to interpolate only a portion of each destination frame (row $R_d$) from each of the plurality of tiles (blocks).

Various data formats can be used for encoding the brightness and color of each pixel of an image. One system is the grayscale data in which only one luma (Y) value data is stored per pixel. Another system is the 8-bit 4:2:2 data format in which four Luma (Y) values and 2 chroma (Cb and Cr) values of four pixels are stored in a ratio of 4:2:2, because the human eye is more sensitive to details of light brightness than to details of color variation. Thus, when interpolating a pixel of a destination frame from a source frame, it may be optimal to use different sized interpolation areas for the luma and chroma data values. For example, a 4×8 area of Luma (Y) data and a 4×4 area of Chroma (Cb and Cr) data from the source frame can be used for interpolation of each pixel of the destination frame in the 8-bit 4:2:2 data format.

The tiling (block) form of the memory management schemes have overhead to access the overlapping source frame data between the adjacent tiles and also the output destination frame data in the block form. When later stages of image processing require the destination frame image data in raster order (e.g., entire rows of pixels from left to right), the overhead of concatenating these blocks of interpolated destination frame data and reading the pixels of each row $R_d$ out in raster order requires more bus bandwidth or requires multiple line buffers to achieve.

SUMMARY

An aspect of the inventive concept provides a pixel interpolation method to perform image rotation without overlapping source frame access between adjacent tiles. The disclosed method requires no extra computational or memory overhead to generate raster order destination data.

An aspect of the invention provides a Digital Image Stabilization method including applying a Principal transform P(n) representing a stationary/background object in the scene of a video frame.

According to one embodiment, an affine transform is performed in a first affine transform engine of the compensation unit based on the received affine coefficients sx, sy, rx, ry, tx and ty and based on calculated target destination frame coordinates to generate the corresponding physical memory locations of the required pixel data of the source frame. In some color data systems, an interpolation area of data (e.g., 4 rows by 8 columns) from the source frame are required for performing an interpolation operation for each pixel of the destination frame. To access the required data for rotation image transformation from source frame area, the disclosed method fetches the pixels of the source frame in diagonally disposed meta-rows corresponding to a row of the destination frame and re-positions these source data pixels horizontally into multiple line buffers, wherein the data in the content stored in the line buffers corresponds to one or more entire rows of pixels in the destination frame. Thus, interpolation can proceed for one or more entire rows of the destination frame in raster order.

Exemplary embodiments of the present invention perform affine transform (image interpolation) with translation, scaling and rotation. All the source frame data needed for generating interpolated pixels of the current row $R_d$ the destination frame are aligned within multiple line buffers of a meta-frame buffer. A horizontally-moving window operation is used during source frame data interpolation process for generating the destination frame data in raster order. The shape of the required (e.g., 4×8) memory window area of source frame for interpolation of each pixel of the destination frame will be shifted if the source frame data in the line buffer has come from different rows of the source frame.

An image processing circuit is provided for rotating an image, comprising: a first transform engine configured to generate a single set of horizontal locations indicating the start and end of each meta-row of pixels in a destination meta-frame portion of an original image frame; a direct memory access controller adapted to read each meta-row of pixels in the destination meta-frame portion and to write each meta-row horizontalized into one of a plurality of line buffers; and a second affine transform engine adapted to interpolate and rotate each pixel of the destination frame and to output the rotated pixels in raster order.

According to one embodiment, the method calculates the locations of image data distributed diagonally within diagonal meta-rows in the source frame and performs line buffer memory management tasks to support the rotation of an image to angle of up to ±45 degrees.

An aspect of the present inventive concept provides an image processing circuit for rotating an image, comprising: a first transform engine configured to generate a set of horizontal locations indicating the start and end of each meta-row of pixels in a rotated destination frame portion of an original image frame; a direct memory access controller configured to read each meta-row of pixels in a destination frame portion and to write each row into one of a plurality of line buffers; and a second affine transform engine configured to interpolate each pixel of the rotated destination frame and to output the pixels in raster order.

The window interpolation moving window process generates the destination frame data in raster order. The interpolation window center location (x',y') will be calculated based on rotation equation, e.g., with affine transform equation coefficients. The interpolation window shape and position will be adjusted depending on the center y' position and the vertical location where the source data are stored in line buffers.

Another aspect of the present inventive concept provides a method of rotating a destination frame portion of an original frame according to affine transform coefficients, comprising: copying the data corresponding to the pixels of the first row of the destination frame into the first among a plurality of line-buffers based on the affine transform coefficients; copying the data corresponding to the pixels of the second row of the destination frame into the second among the plurality of line-buffers based on the affine transform coefficients; interpolating and rotating each pixel seriatim in the first row of the destination frame based on the data stored in the plurality of line buffers and outputting the interpolated pixels of the first row of the destination frame in raster order, and then interpolating and rotating each pixel seriatim in the second row of the destination frame based on the data stored in the plurality of line buffers and outputting the interpolated pixels of the second row of the destination frame in raster order.

Another aspect of the invention provides a method of applying a Principal transform P(n) representing a stationary/background object in the scene of a video frame.

Another aspect of the present invention provides a method of rotating a destination frame portion of a source frame according to affine transform coefficients, comprising: copying the image data of pixels of a source frame in a first meta-row corresponding to the pixels of the first row of the destination frame into a first line-buffer based on the affine transform coefficients; copying the image data of pixels of the source frame in a second meta-row corresponding to the pixels of the first row of the destination frame into a second line-buffer based on the affine transform coefficients; and interpolating each pixel of the first row of the destination frame seriatim based on the image data stored in the first and second line buffers and outputting the interpolated pixels of the first row of the destination frame in raster order.

The exemplary method may further comprise: copying the image data of pixels of the source frame in a third meta-row corresponding to the pixels of the first row of the destination frame into a third line-buffer based on the affine transform coefficients; copying the image data of pixels of the source frame in a fourth meta-row corresponding to the pixels of the first row of the destination frame into a fourth line-buffer based on the affine transform coefficients; and interpolating each pixel of the first row of the destination frame seriatim based on the image data stored in the first, second, third and fourth line buffers and outputting the interpolated pixels of the first row of the destination frame in raster order.

Various exemplary embodiments of the inventive concept handle affine transforms including translational and rotational motion within a certain rotation degree (e.g., up to ±45 degrees). Various other exemplary embodiments of the inventive concept are optimized to handle affine transforms including translational and rotational motion within a 4:2:2 data format and a lesser rotation degree.

Because the source frame data of pixels within the same row $R_d$ of the destination frame may come from different lines of source frame, a first step is to re-arrange the source frame data into horizontalized meta-rows according to the angle of rotation of the destination frame. The first step arranges all the required source frame data corresponding to an entire row $R_d$ of a destination frame within multiple horizontal line buffers storing horizontalized meta-rows of the source frame data $D_{sf}$. Preferably, every line of the buffer memory can be read simultaneously during the interpolation process, and any lines of the buffer memory not then involved in the interpolation process can be simultaneously written with the next required source frame data. Thus, preferably, each row of the buffer memory is implemented as an independently accessible line-buffer.

When the required source frame data is available in the buffer memory, a simple and smooth horizontally moving-window interpolation operation is performed to generate in raster order the destination frame data $D_{df}$ of every pixel in each row $R_d$ of the destination frame.

The size of the meta-frame buffer needed to store the horizontalized meta-rows of source frame data $D_{sf}$ is reduced in various exemplary embodiments by reusing a k-line buffer, wherein k is an integer, to temporarily store the destination frame data $D_{df}$ corresponding to one or more rows $R_d$ of the destination frame. If the horizontally moving-window has nominal dimensions of 4×4 pixels or 4×8 pixels, then only four lines of the line buffer are needed to store destination frame data $D_{df}$ corresponding to one or more rows $R_d$ of the destination frame if the rotation angle of the destination frame is zero (see e.g., FIG. 14). But, if the moving-window has nominal dimensions of 4×4 pixels and if the rotation angle of the destination frame is ±45 degrees, then seven lines of the line buffer are needed to store the destination frame data $D_{df}$ corresponding to only one row $R_d$ of the destination frame. Thus, a seven-line buffer storing seven horizontalized meta-rows of source frame data $D_{sf}$ contains enough data to 4×4 interpolate at least one and up to four entire rows $R_d$ of the destination frame, depending upon the rotational angle of the destination frame. If the interpolation-window has nominal dimensions of 4×8 pixels, then a seven-line buffer can handle a rotation angle of up to 22.5 degrees. If the rotation angle of the destination frame is ±45 degrees, more than seven lines of buffer are needed to store the destination frame data $D_{df}$ corresponding to one row $R_d$ of the destination frame.

The split-shape of the horizontally moving-window of the interpolation step will change depending upon the rotational angle of the destination frame, and at lower angles, depending upon whether it is split by no breaking lines, by one breaking line or by multiple breaking lines. In some exemplary embodiments, the rotational angle is limited so that each moving-window of the interpolation step will be spit by at most only one breaking line (see e.g., FIG. 15).

An aspect of the invention provides a Digital Image Stabilization circuit adapted to perform the herein disclosed DIS methods. The circuit employed to filter out the jitter caused by the camera's trajectory from a sequence of video frames may be contained within a video camera itself, and activated to remove in real time the jitter prior to storage of the captured video frames. Alternatively the DIS circuit employed to estimate camera trajectory between consecutive video frames and to filter out the jitter from a stored sequence of video frames may be a general purpose microcomputer controlled by software embodying a digital image stabilization (DIS) method, or may be a dedicated hardware, such as an MEPG video encoder embodied in an ASIC (application specific integrated circuit) optimized to perform a digital image stabilization (DIS) method.

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Like numbers refer to like elements throughout.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the figures:

FIG. 6 is a diagram illustrating horizontalized meta-rows stored in the luma Y meta-frame buffer according to an embodiment of the present inventive concept;

DESCRIPTION OF EXEMPLARY EMBODIMENTS

Figure 1:
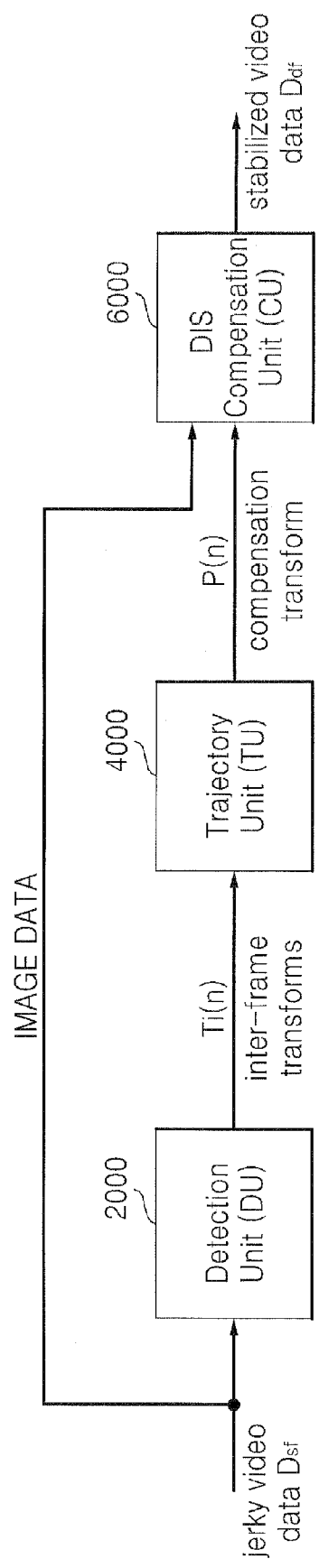
FIG. 1 is a block diagram of Digital Image Stabilization (DIS) circuit performing a DIS method in accordance with an exemplary embodiment of the inventive concept.

FIG. 1 is a block diagram of Digital Image Stabilization (DIS) circuit performing a DIS method in accordance with an exemplary embodiment of the inventive concept. The DIS circuit comprises an Detection Unit (DU) that analyses received jerky video data $D_{sf}$ of a source frame and outputs inter-frame transforms $T_i(n)$, a Trajectory Unit (TU) that outputs a selected Principal/compensation transform P(n) selected from among the inter-frame transforms $T_i(n)$, and a Compensation Unit (CU) that outputs stabilized video data $D_{df}$ of a destination frame by modifying the jerky video based on the selected Principal/compensation transform P(n).

After the Detection. Unit (DU) estimates inter-frame transforms $T_i(n)$, the Trajectory Unit (TU) selects one of the inter-frame transforms $T_i(n)$ as the principal transform P(n). If the principal transform P(n) includes a rotational motion component, the Compensation Unit (CU) rotates and interpolates and outputs stabilized video data $D_{df}$ of the pixels of the destination frame in raster order (row by row starting at the top row and from left to right within each row).

Figure 2:
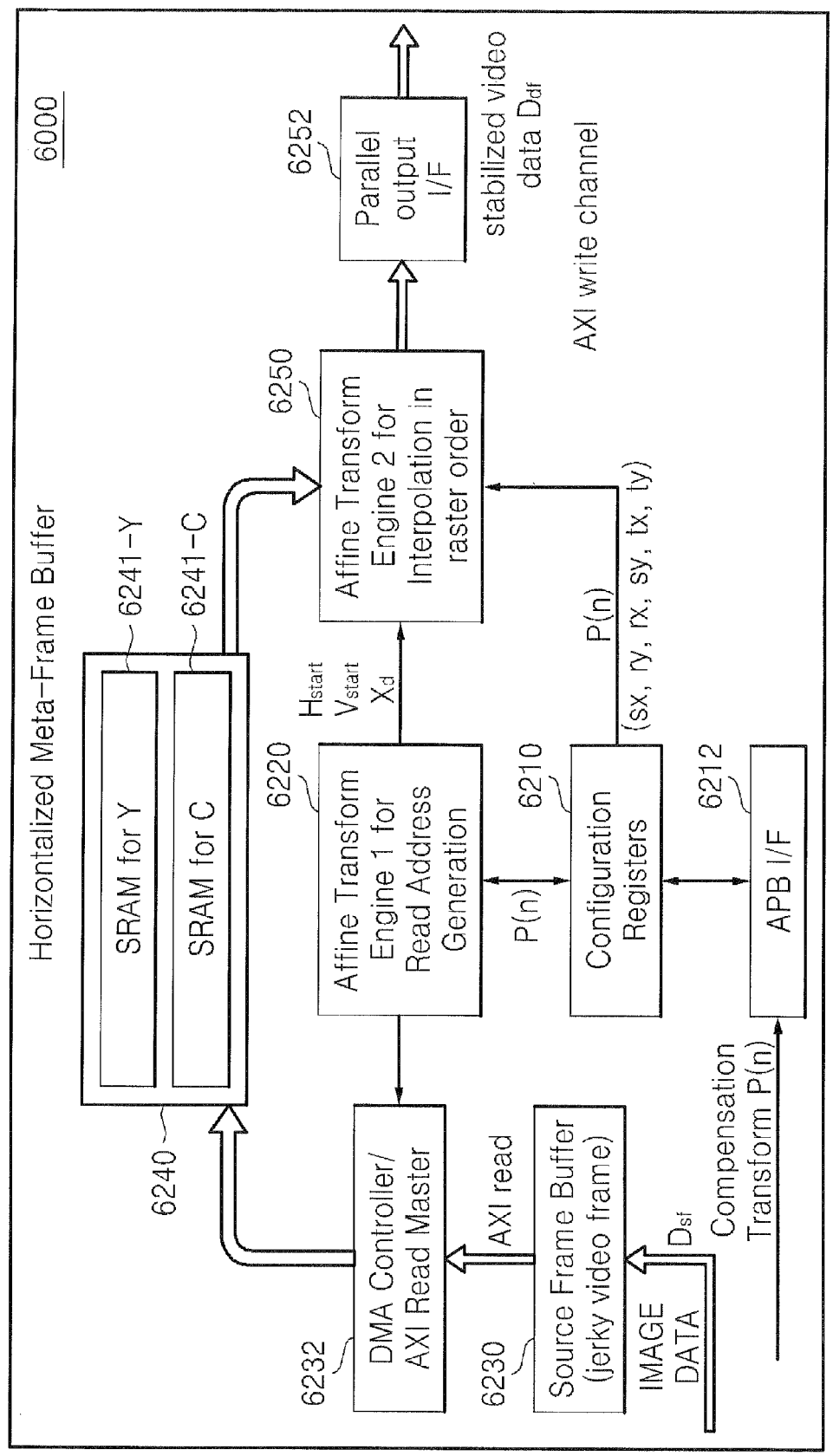
FIG. 2 is a block diagram of the DIS Compensation Unit in the DIS circuit of FIG. 1 adapted to apply the compensation transform P(n) to the captured source frame image data $D_{sf}$ to interpolate and rotate and output the data $D_{df}$ of pixels of a destination frame in raster order.

FIG. 2 is a block diagram of the DIS Compensation Unit 6000 in the DIS circuit of FIG. 1 adapted to apply the compensation transform P(n) to the captured source frame image data $D_{sf}$ to interpolate and output the data $D_{df}$ of the destination frame in raster order.

The DIS Compensation Unit 6000 includes, a first transform engine 6220 for generating horizontal location information (e.g., read addresses) and for calculating the break line spacing, a DMA (direct memory access) controller/Read Master 6232, and a second transform engine 6250 for interpolating (e.g., rotating, translating, scaling) pixels of the destination frame in raster order. The transform engines can be one of the geometric transforms such as Similarly transform, Affine transform or the like. The Affine transform is chosen for purposes of illustration and explanation of the embodiments of the present inventive concept, but other like geometric transforms can be used without departing from the scope and spirit of the present invention.

The parallel data output interface 6252 outputs image data (4:2:2) and provides the image frame synchronization signals and a back pressure stall (output buffer) mechanism. The DMA controller/Read Master 6232, reads selected portions of the source frame data $D_{sf}$ stored in the Source Frame Buffer 6230 and writes the source frame data $D_{sf}$ into each appropriate line-buffer of the Horizontalized. Meta-Frame Buffer 6240. Each target source frame data access memory address is calculated by the first affine transform engine 6220 from the affine transform equation based on the principal transform P(n) coefficients sx, ry, rx, sy, tx and ty.

The DIS Compensation Unit 6000 further includes configuration registers 6210 that receive and store the principal transform P(n) coefficients sx, ry, rx, sy, tx and ty and pass them to each of the first and second affine transform engines 6220 and 6250.

The DMA/Read Master 6232 on the AXI bus receives instructions (target source frame data access memory addresses) from the first Affine Transform Engine 6220 based on image position and rotation information P(n) received from the APB bus via a APB interface (I/F) 6212 and from the configuration registers 6210.

Figure 3:
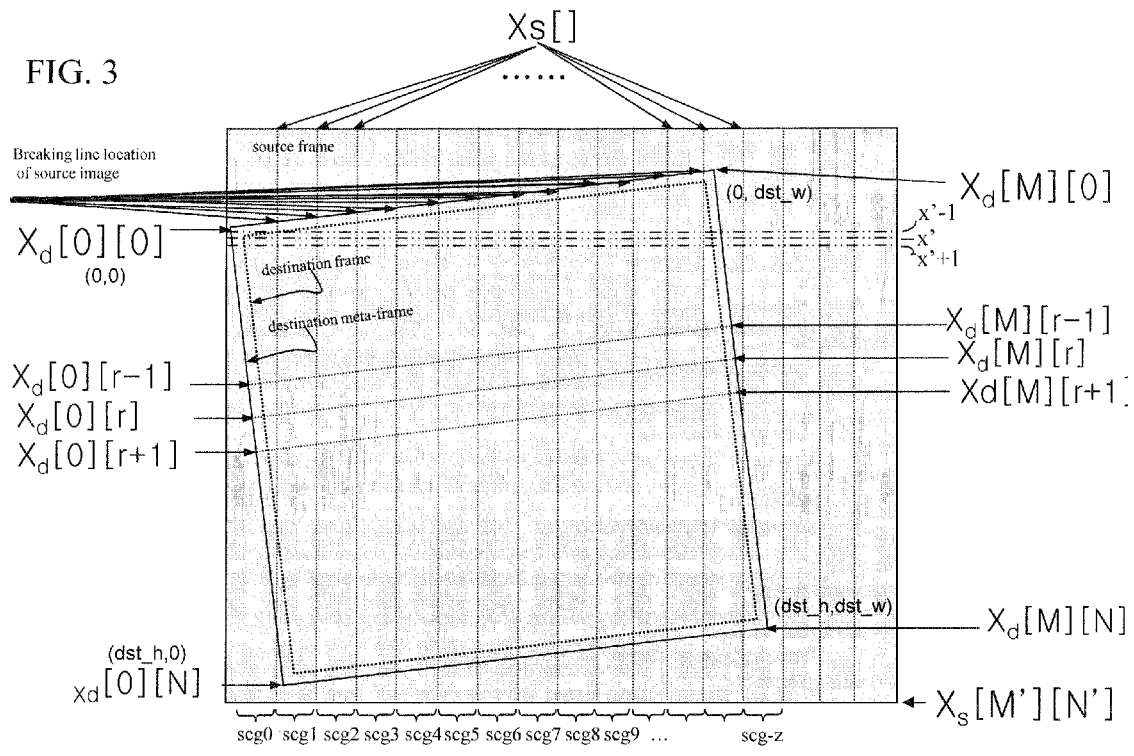
FIG. 3 is a diagram of the captured source frame including an exemplary destination meta-frame comprising a plurality of diagonally-oriented meta-rows each containing a subset of the source frame image data $D_{sf}$ and illustrating the relative position of a destination frame to be obtained by interpolating the source frame image data $D_{sf}$ contained in the meta-rows of the destination meta-frame, in accordance with an exemplary embodiment of the inventive concept.

FIG. 3 is a diagram of the captured source frame including an exemplary destination meta-frame comprising a plurality of diagonally step-oriented meta-rows $X_d$ each containing a subset of the source frame image data $D_{sf}$ and the relative position of the destination frame to be obtained by interpolating the source frame image data $D_{sf}$ contained in the meta-rows $X_d$ of the destination meta-frame, in accordance with an exemplary embodiment of the inventive concept. A plurality (e.g., four) of adjacent diagonally step-oriented meta-rows $X_d$ contain the image data $D_{sf}$ required to interpolate each row $R_d$ of the destination frame.

Four corners of the destination frame (0,0), (0, dst_w), (dst_h,0) and (dst_h,dst_w) and the affine coefficients P(n) (sx,sy,rx,ry,tx,ty) are sent to the first affine transform engine 6220 to calculate the corresponding source frame data locations. The scaling affine coefficients ensure that the source frame data is available for interpolating the destination frame.

The rectangular source frame in FIG. 3 illustrates identifying the start and end locations of each broken line of pixels in a meta row $X_d$ corresponding to a horizontal row $R_d$ of pixels of the rectangular destination frame (shown rotated with dotted lines) source frame The set of horizontal locations X'[1] indicate the intersection of the upper breaking line at each row of pixels of the original source frame. The set of horizontal locations Xs[0][n] indicate the "beginning" of each meta-row among the M×N pixels of the destination meta-frame, at the intersections of the left breaking line at each row of pixels of the original source frame. The set of horizontal locations Xs[M][n] indicate the "end" of each meta-row of pixels of the destination meta-frame, at the intersections of the left breaking line at each row of pixels of the original source frame.

Figure 4:
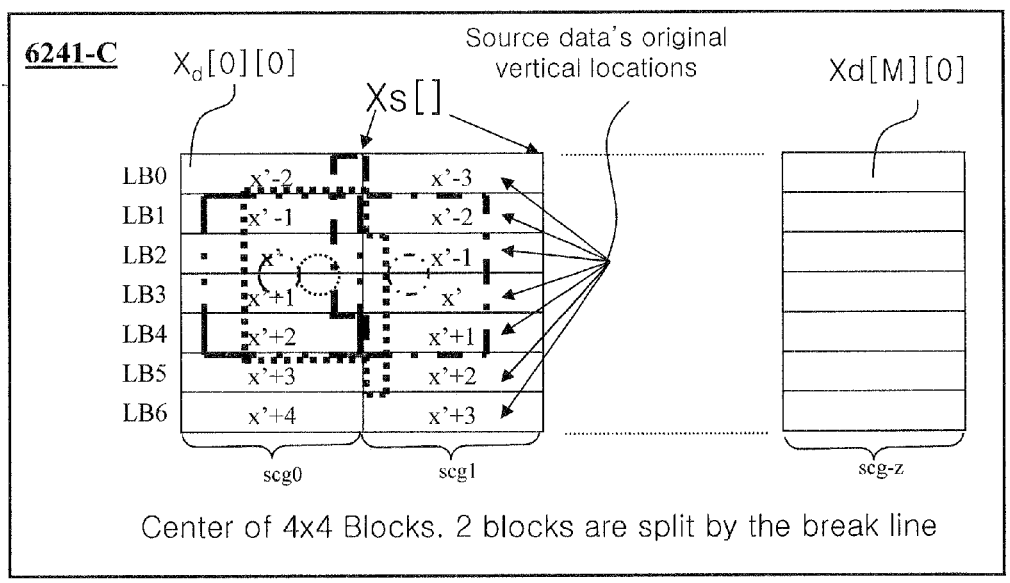
FIG. 4 is a diagram of a portion of horizontalized meta-rows of the exemplary destination meta-frame shown in FIG. 3 as stored in a luma Y meta-frame buffer and the interpolation windows of three exemplary pixels of the destination frame in accordance with an exemplary embodiment of the inventive concept.

FIG. 4 is a block diagram of the chroma meta-frame buffer 6241-C showing of a portion of seven horizontalized meta-rows of the exemplary destination meta-frame shown in FIG. 3 stored in the chroma C meta-frame buffer 6241-C of the DIS Compensation Unit 6000 of FIG. 2, and the interpolation windows of three exemplary pixels of the destination frame, two of the interpolation windows being split/shifted/stepped by a vertical break line in accordance with an exemplary embodiment of the inventive concept.

Shown in FIG. 4 is a portion of seven horizontalized meta-rows of the exemplary destination meta-frame shown in FIG. 3 stored in seven line-buffers LB0 through LB6 of the chroma C meta-frame buffer 6241-C of the DIS Compensation Unit 6000 of FIG. 2. FIG. 4 also illustrates the interpolation windows of three example pixels of the destination frame, two of the interpolation windows being split/shifted/stepped by a vertical break line in accordance with an exemplary embodiment of the inventive concept. Every interpolation window is split/shifted by every break line that runs vertically through it, or by no break line if no break line runs vertically through it. The 4×4 interpolation window having solid-line corners and dotted side lines is not split by any break line, and this is an intact square. The 4×4 interpolation window having solid-line corners and dotted side lines comprises data only from column group scg0 and from only four rows $R_s$(x'−1, x, x'+1, x'+2) of the source frame.

The 4×4 interpolation window having dotted lines is split by one break line between its third and fourth columns, and thus is split and shifted by that break line. Thus the left 3×4 portion of the 4×4 interpolation window having dotted lines comprises data from column group scg0 and from column group scg1. The right portion 1×4 of the interpolation window comprises data from column group scg1, and the left portion 3×4 of the interpolation window comprises data from column group scg0, which are bounded by the break line. While the 4×4 interpolation window having dotted lines comprises data from only four rows $R_s$ (x'−1, x, x'+1, x'+2) of the source frame, it spans five line buffers (LB1, LB2, LB3, LB4, LB5) because of the horizontalization of the 4×4 interpolation windows of the destination meta-frame within the line buffers.

The 4×4 interpolation window having dashed lines is split by the same break line between its first and second columns, and thus is split and shifted by that same break line. Thus the left 1×4 portion of the 4×4 interpolation window having dashed lines comprises data from column group scg0 while the right 3×4 portion of the 4×4 interpolation window comprises data from column group scg1, which are bounded by the break line. While the 4×4 interpolation window having dashed lines comprises data from only four rows $R_s$ (x'−2, x'−1, x, x'+1) of the source frame, it spans five line buffers (LB0, LB1, LB2, LB3, LB4).

Figure 5:
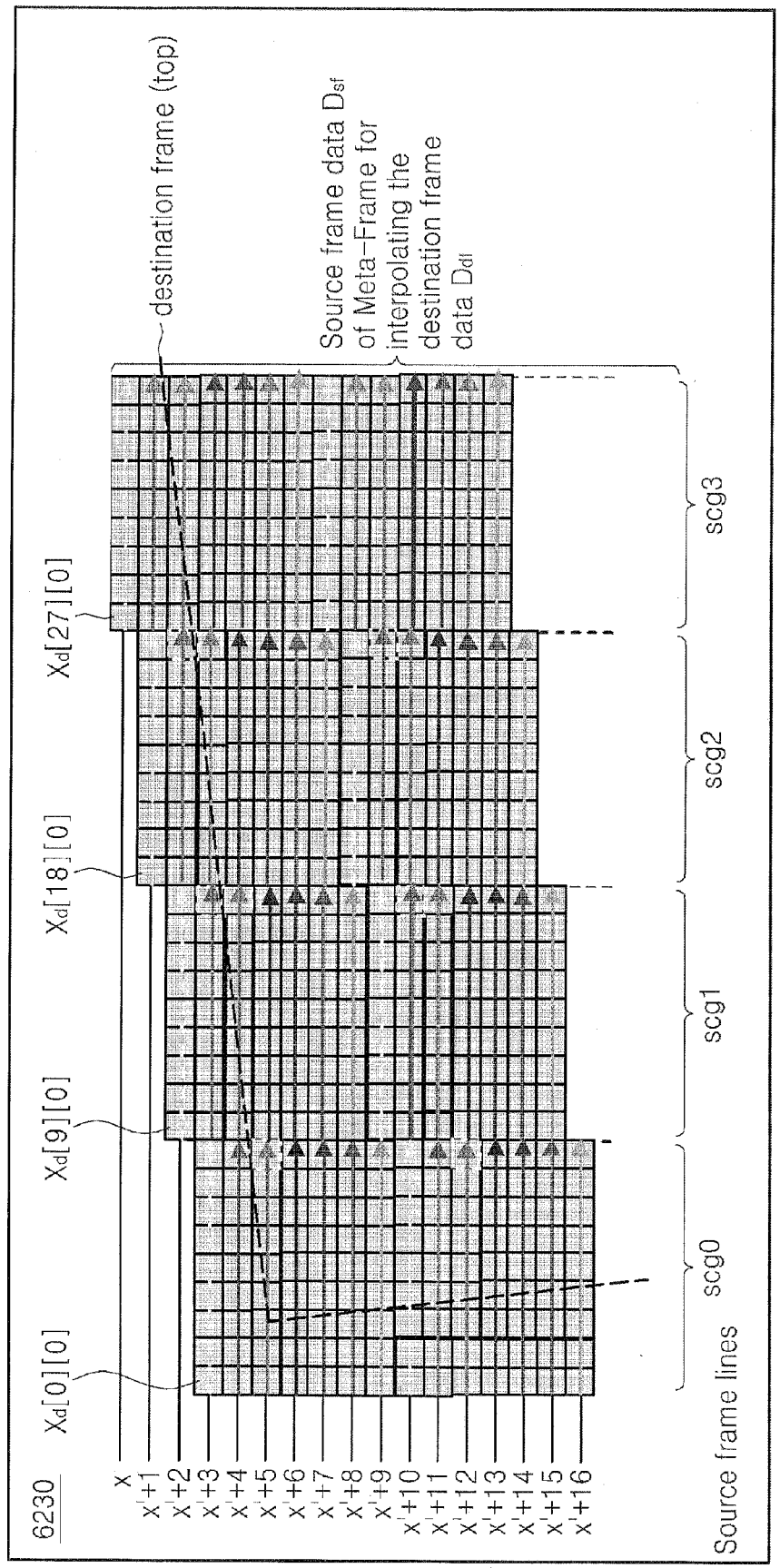
FIG. 5 is a diagram illustrating fourteen diagonally step-oriented meta-rows of an exemplary destination meta-frame and a plurality of regularly spaced vertical break lines defining a plurality of split/shifted/stepped column groups in a destination meta-frame.

FIG. 5 is a detailed diagram of a portion of fourteen diagonally step-oriented meta-rows $X_d$ of the exemplary destination meta-frame shown in FIG. 3, stored in the source frame buffer 6230 of FIG. 2 illustrating a plurality of regularly spaced vertical break lines defining a plurality of split/shifted/stepped column groups (scg) in the destination meta-frame.

Referring to FIG. 3 and FIG. 5, each diagonally step-oriented meta-row $X_d$ is split by a number of vertical break lines ranging from zero break lines in the case of no rotation or of very slight rotation, up to as many as one break line per pixel width in the case of a ±45 degree rotation. Because all meta-rows $X_d$ of a given destination meta-frame have the same horizontal extent, and because break lines are regularly spaced (at the width of each stepped column group e.g., scg0), all meta-rows $X_d$ of the destination meta-frame will have approximately the same number of break lines with a variation of ±1 due to horizontal shifting, rotation angle, and the horizontal size of the destination frame. For small angles of rotation, each meta-row $X_d$ of the destination meta-frame will have none, one or two break lines. All meta-rows that span one or more break lines will necessarily have their diagonally distributed source frame data $D_{sf}$ divided into multiple rows $R_s$ of the source frame (e.g., in source frame rows x', x'−1, x'−2, x'−3, etc.)

FIG. 6 is a detailed diagram of a portion of nine horizontalized meta-rows of the exemplary destination meta-frame shown in FIG. 3 stored in the luma Y meta-frame buffer 6241-1-Y (an exemplary implementation of 6241-Y of the DIS Compensation Unit 6000 of FIG. 2, according to a first exemplary embodiment of the inventive concept). The 8-bit 4:2:2 (single plane, YC data are in interleave format) data format is fully supported by this exemplary implementation with a rotation angle up to ±45 degrees.

Referring to FIG. 4 and FIG. 6, when the source frame data $D_{sf}$ of one meta-row $X_d$ of the destination meta-frame has been copied into one line-buffer, source frame data $D_{sf}$ from two or more different rows $R_s$ (e.g., from rows x', x'−1, x'−2, x'−3, etc.) of the source frame are copied into the line-buffer selected to store the horizontalized source frame data $D_{sf}$ of the one meta-row $X_d$ of the destination meta-frame.

FIG. 5 and FIG. 6 together illustrate the result of a method of horizontalizing diagonally step-oriented meta-rows. In FIG. 5, only a portion of the source frame image data $D_{sf}$ within fourteen of the meta-rows $X_d$ of the meta-frame of the destination frame is shown. Each of the meta-rows $X_d$ shown in FIG. 5 is split by the same set of break lines (e.g., spaced apart by 9 pixel widths) at $X_d$[9][ ], $X_d$[18][ ], $X_d$[27][ ]. Thus, the meta-rows $X_d$ shown in FIG. 5 contains source frame image data $D_{sf}$ from four rows $R_s$ (e.g., x'+3, x'+2, x'+1, and x in the first meta row) of the source frame. Within the meta-frame of the destination frame is shown the border of the interpolated destination frame. Seven of the same meta-rows $X_d$ shown as diagonally disposed in FIG. 5 are shown horizontalized in seven line buffers LB0, LB1, LB2, LB3, LB4, LB5, and LB6 in FIG. 6. As illustrated in FIG. 6, the segment of a given meta-row $X_d$ disposed in each column group segment (e.g., scg0, scg1, etc.) is copied into the same line buffer. This is the horizontalization step. For example, in FIG. 5, the first meta-row $X_d$ comprises a first segment within scg0 and row x'+3 of the destination frame, and a second segment within scg1 and row x'+2 of the destination frame, a third segment within scg2 and row x'+1 of the destination frame, and a fourth segment within scg3 and row x' of the destination frame. In FIG. 6, the first segment, second segment, third segment, and fourth segment of the first meta-row $X_d$ in the destination meta-frame are all shown copied horizontalized into the first line buffer LB0 of the meta-frame buffer memory 6241-1-Y. The DMA controller/Read Master 6232 of FIG. 2 performs this selective copy-and-paste operation sequentially for each meta-row Xd of the destination meta-frame, under the control of the first Affine Transform Engine 6220. The exemplary implementation 6241-1-Y of the Luma Y meta-frame buffer 6241-Y in the Horizontalized Meta-Frame Buffer 6240 in FIG. 6 stores the Luma Y data of the entire Meta-Frame of the destination frame. Thus, in this exemplary implementation the DMA controller/Read Master 6232 of FIG. 2 can copy-and-paste the required source image data of the entire destination meta-frame into the Luma meta-frame buffer 6241-1-Y of FIG. 6. In various alternative embodiments, the DMA controller/Read Master 6232 of FIG. 2 performs a copy-and-past operation sequentially for each entire column group portion of the destination meta-frame, writing each column group sequentially (e.g., scg0, then scg1, etc.) into the line buffers until all the meta-rows of the meta-frame are stored horizontalized in the line buffers. In alternative embodiments of FIGS. 7B, 9, 10, and 11, the DMA controller/Read Master 6232 of FIG. 2 performs a copy-and-past operation for seven meta-rows of the destination meta-frame into a buffer having seven line-buffers LB0 through LB6 which are re-used for interpolation of the entire destination frame.

Referring to FIGS. 2, 3 and 4, as will be fully described herein below, the DMA controller 6232 reads the diagonally distributed source frame image data $D_{sf}$, in meta-rows pertaining to rows $R_d$ of the destination frame from multiple rows $R_s$ of the source frame and then writes the image data $D_{sf}$ horizontalized into the luma (Y) line-buffers of meta-frame buffer 6241-Y and into the chroma (C) line-buffers of meta-frame buffer 6241-C. Next, the second Affine Transform Engine 6250 reads interpolation windows (e.g., 4×4 or 4×8 pixel areas) of the horizontalized Luma and Chroma source data (e.g., in the case of 4:2:2, 4×8 pixels of Luma Y data and 4×4 pixels of Chroma C data) stored in the line buffers to generate each one interpolated pixel of the (rotated) destination frame and outputs the interpolated pixels of each row of the (rotated) destination frame in raster order.

The target source frame data access memory address is calculated by using the affine transform equation and the received affine transform coefficients of P(n). Read DMA channels access the source frame in buffer 6230 (or in an external DRAM) data via the AXI bus master interface having a 128-bit data bus width.

Figure 7A:
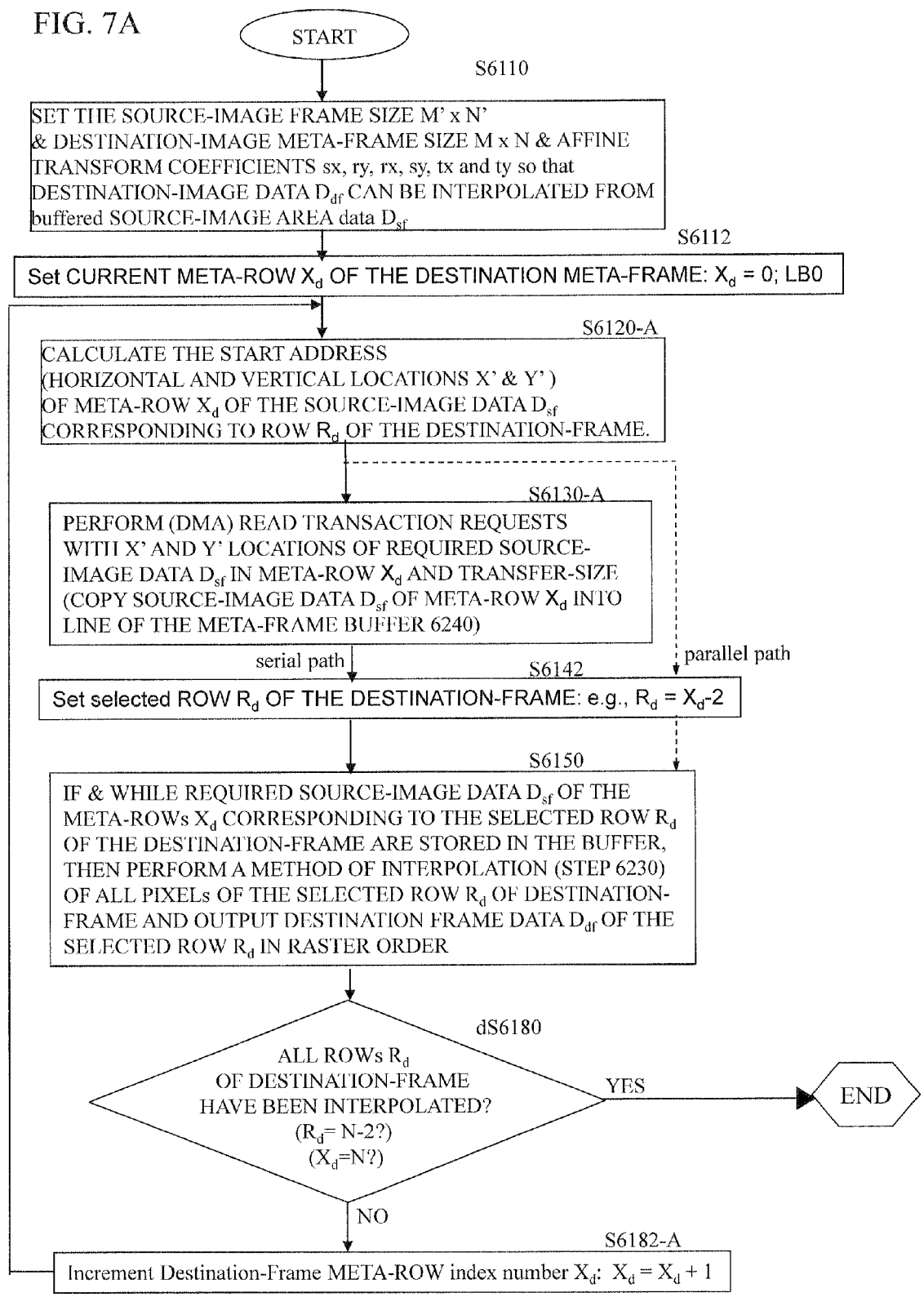
FIG. 7A is a flow chart of a method of sequentially horizontalizing diagonally step-oriented meta-rows of a destination meta-frame in a source frame image and of writing the horizontalized image data $D_{sf}$ into rows of the meta-frame buffer for moving-window interpolation of pixels in raster order according to an embodiment of the present inventive concept.

FIG. 7A is flow chart of a first exemplary method of sequentially horizontalizing the plurality of diagonally step-oriented meta-rows of a destination meta-frame in a source frame image stored in the Source frame Buffer 6230 of the DIS Compensation Unit 6000 of FIG. 2. This method writes all of the horizontalized image data $D_{sf}$ into all of the rows of the meta-frame buffer 6240 for moving-window interpolation of pixels in raster order. This step is performed by the Affine Transform Engine II 62520 of the DIS Compensation Unit 6000 of FIG. 2.

In step S6110, the affine transform coefficients including a scaling factor are set based on the source frame dimensions M'×N' to set the destination frame dimensions M×N so that all the source frame data $D_{sf}$ needed to interpolate the destination frame data $D_{df}$ is (available) within the source frame area.

In step S6112, the loop index is initialized so that the first meta-row Xd=0 of the destination meta-frame is selected. In step S6120-A, the start address of the horizontal and vertical location of the current meta-row $X_d$ of the destination meta-frame in the source image is calculated by the first affine transform engine 6220. In step S6130-A, the DMA controller 6232 copies the source image data in the selected meta-row $X_d$ from the source frame buffer 6230 into one of the line buffers of the Horizontalized Meta-Frame Buffer 6240. In step S6142, a row $R_d$ of the destination image is selected for interpolation based on the meta-rows $X_d$ that have been copied horizontalized into the line buffers of the Horizontalized Meta-Frame Buffer 6240.

In step S6150, if and while all the required source-image data $D_{sf}$ of the meta-rows $X_d$ corresponding to the selected row $R_d$ of the destination-frame are stored in the Horizontalized Meta-Frame Buffer 6240, then a method of interpolation (step 6230 of FIG. 8) of all pixels of the selected row $R_d$ of destination-frame is performed and the interpolated destination frame data $D_{df}$ of the selected row $R_d$ is output in raster order.

In step dS6180, it is checked whether all rows $R_d$ of the destination frame have been interpolated. If in decision step dS6180 all rows $R_d$ of the destination frame have not been interpolated (NO branch of dS6180), then the meta-row index number is incremented (step S6182-A) and the method repeats step S6120-A in the start of the next execution of the loop. If in decision step dS6180 all rows $R_d$ of the destination frame have been interpolated (YES branch of dS6180), then the method of interpolating the destination frame of the current source frame is complete.

In practice, the step of interpolating (step S6230 of FIG. 8) pixels of a selected row $R_d$ of destination-frame may be performed using a first set of line buffers at the same time (parallel path) that source frame data is being copied into a second set of line buffers during step S6130-A, and the interpolated destination frame data $D_{df}$ of the selected row $R_d$ is output in raster order. Thus, in parallel-path implementations of the method, the step (S6230 of FIG. 8) of interpolating rows $R_d$ of the destination frame may proceed in parallel just behind the progress of the meta-row copying step S6130-A in the loop. This exemplary embodiment may be implemented by providing a full sized Horizontalized Meta-Frame Buffer 6240 into which all the source frame data $D_{sf}$ needed to interpolate the entire destination frame is copied and stored. In various other exemplary implementations, the number of line buffers in the Horizontalized Meta-Frame Buffer 6240 can be reduced by reusing line-buffers to store the source frame data $D_{sf}$ of different meta-rows of the destination frame at different times. For example, if the interpolation window is 4×8 and the desired maximum angle of rotation is ±45 degrees, then up to 11 line buffers filled with horizontalized source frame data are need to interpolate the pixels of one row $R_d$ of the destination frame. Thus, a Horizontalized Meta-Frame Buffer 6240 consisting essentially of eleven line buffers is minimally sufficient to 4×8 interpolate the all the pixels of all rows $R_d$ of the destination frame in raster order with a rotation angle of up to ±45 degrees. Providing fewer than eleven line buffers effectively reduces the rotation angle that can be 4×8 interpolated. On the other hand, providing more than eleven line buffers enables round-robin reuse of line buffers for 4×8 interpolation of a sequence of rows $R_d$ e.g., based on mapping of a horizontal break line splitting some interpolation windows.

Figure 7B:
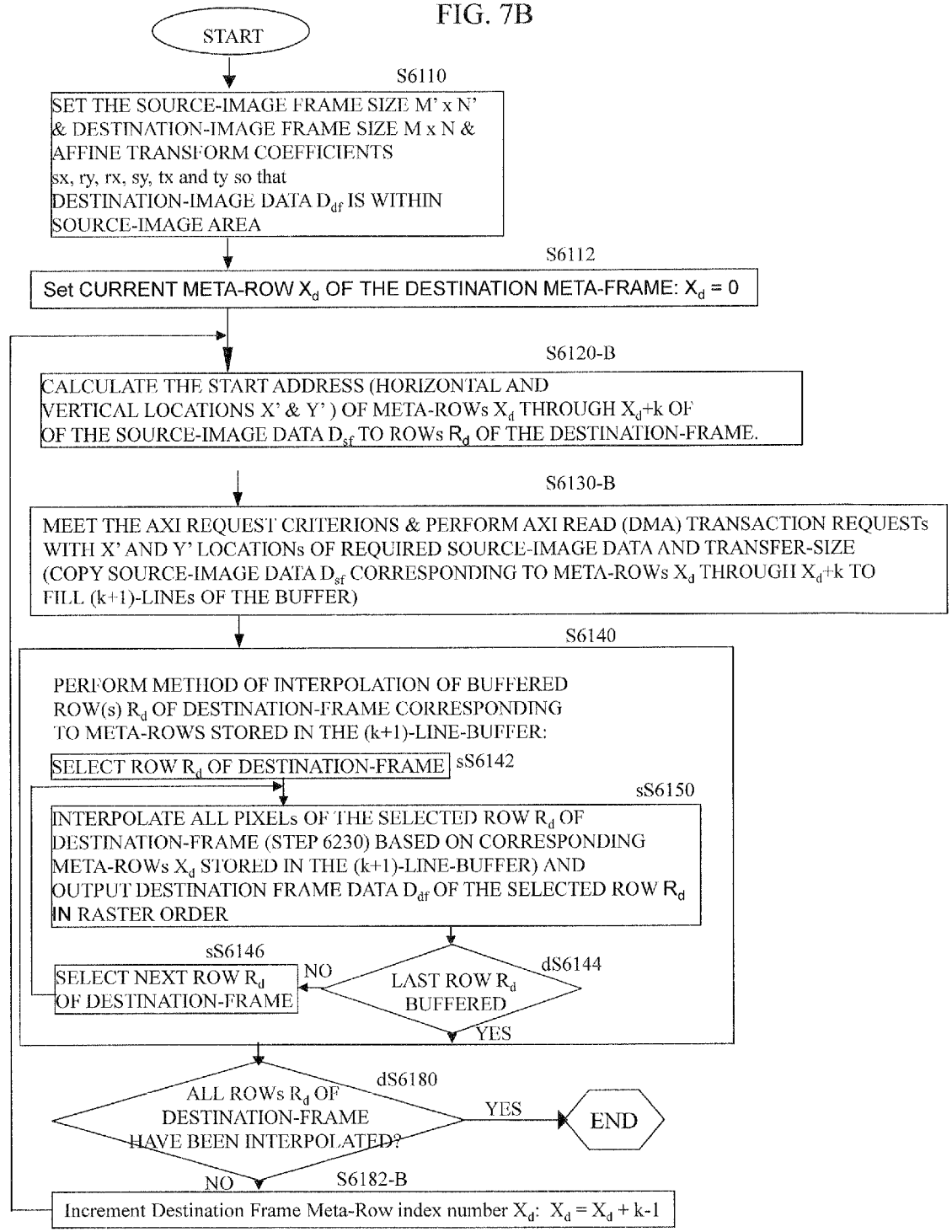
FIG. 7B is a flow chart of another method of sequentially horizontalizing each group of k+1 diagonally step-oriented meta-rows of a destination meta-frame in a source frame image and of writing the k+1 rows of horizontalized image data into a (k+1)-line meta-frame buffer for moving-window interpolation of pixels in raster order according to an embodiment of the present inventive concept.

FIG. 7B is flow chart of a second exemplary method of sequentially horizontalizing each group of k+1 diagonally step-oriented meta-rows $X_d$ of a destination meta-frame in the source frame image stored in the Source frame Buffer 6230 of the DIS Compensation Unit 6000 of FIG. 2. This method writes k+1 rows of horizontalized image data $D_{sf}$ from k+1 rows of the destination meta-frame into the (k+1)-line buffers of meta-frame buffer 6241-2-Y. The horizontalized image data $D_{sf}$ in the (k+1)-line buffers of meta-frame buffer 6241-2-Y are next used for moving-window interpolation of the pixels in one or more rows $R_d$ of the destination frame in raster order by the Affine Transform Engine II 6250 of the DIS Compensation Unit 6000 of FIG. 2. After all the horizontalized image data $D_{sf}$ in the (k+1)-line buffers have been used for interpolations, this method loops back and writes the next k rows of horizontalized image data $D_{sf}$ from k rows of the destination meta-frame into the (k+1)-line buffers of meta-frame buffer 6241-2-Y.

In step S6110, the affine transform coefficients including a scaling factor are set based on the source frame dimensions M'×N' to set the destination frame dimensions M×N so that all the source frame data $D_{sf}$ needed to interpolate the destination frame data $D_{df}$ is (available) within the source frame area.

In step S6112, the loop index is initialized so that the first meta-row Xd=0 of the destination meta-frame is selected, and the number of line buffers (k+1) used in the Horizontalized Meta-Frame Buffer 6240 is determined.

In step S6120-B, the start address of the horizontal and vertical location source frame data $D_{sf}$ of the selected meta-rows $X_d$ through $X_{d+k}$ of the destination meta-frame in the source image is calculated by the first affine transform engine 6220. In step S6130-B, the DMA controller 6232 copies source frame data $D_{sf}$ of the selected meta-rows $X_d$ through $X_{d+k}$ of the destination meta-frame from the source frame buffer 6230 horizontalized into k+1 line buffers of the Horizontalized Meta-Frame Buffer 6240.

In step S6140, all possible destination frame pixel interpolations based on the source frame data $D_{sf}$ of the meta-rows $X_d$ through $X_{d+k}$ stored in the k+1 line buffers of the Horizontalized Meta-Frame Buffer 6240 are performed.

In substep S6142, a row $R_d$ of the destination image is selected (by setting a destination row index) for interpolation based on the meta-rows $X_d$ through $X_{d+k}$ that have been copied horizontalized into the line buffers of the Horizontalized Meta-Frame Buffer 6240.

In substep sS6150, the required source-image data $D_{sf}$ of the meta-rows $X_d$ corresponding to the selected row $R_d$ of the destination-frame has been stored in the Horizontalized Meta-Frame Buffer 6240, and a method of interpolation (step S6230 of FIG. 8) of all pixels of the selected row $R_d$ of destination-frame is performed and the interpolated destination frame data $D_{df}$ of the selected row $R_d$ is output in raster order.

In decision step dS6150, it is checked whether all rows $R_d$ of the destination frame that can be interpolated from the meta-rows $X_d$ through $X_{d+k}$ that have been copied horizontalized into the line buffers of the Horizontalized Meta-Frame Buffer 6240 have been interpolated. If in decision step dS6150 all interpolatable rows $R_d$ of the destination frame have not been interpolated (NO branch of dS6150), then the meta-row index number is increased and the method repeats step S6120-A in the start of the next execution of the loop. Thus, in substep sS6146, the index of the destination frame row $R_d$ is incremented, and the substep sS6150 is repeated for the next destination frame row $R_{d+1}$.

If in decision step dS6150 all interpolatable rows $R_d$ of the destination frame have been interpolated (YES branch of dS6150), then the interpolating of rows $R_d$ that can be interpolated based on the meta-rows $X_d$ that have been copied horizontalized into the line buffers of the Horizontalized Meta-Frame Buffer 6240 is complete.

In decision step dS6180, it is checked whether all rows $R_d$ of the destination frame have been interpolated. If in decision step dS6180 all rows $R_d$ of the destination frame have not been interpolated (NO branch of dS6180), then the meta-row index number is increased (e.g., by k−1 in step S6182-B) and the method repeats step S6120-B in the start of the next execution of the loop. If in decision step dS6180 all rows $R_d$ of the destination frame have been interpolated (YES branch of dS6180), then the method of interpolating the destination frame of the current source frame is complete.

The step of interpolating (step S6230 of FIG. 8) pixels of a selected row $R_d$ of destination-frame is performed using the horizontalized image data $D_{sf}$ stored in the k+1 line buffers. Depending upon the angle of rotation, interpolation of additional rows $R_d$ of the destination-frame may be performed using the horizontalized image data stored in the k+1 line buffers. For example, if k equals eleven (12 line buffers), then two rows $R_d$ of the destination-frame can be 4×8 interpolated with a rotation angle of ±45 degrees. Similarly, if k equals eleven (12 line buffers), then five rows $R_d$ of the destination-frame can be 4×4 interpolated with a rotation angle of ±45 degrees.

In such exemplary implementations, the number of line buffers in the Horizontalized Meta-Frame Buffer 6240 is reduced by reusing line-buffers to store the source frame data $D_{sf}$ of different meta-rows of the destination frame at different times. For example, if the interpolation window is 4×8 pixels and the desired maximum angle of rotation is ±45 degrees, then 11 line buffers filled with horizontalized source frame data $D_{sf}$ are needed for interpolation of the pixels of one row $R_d$ of the destination frame. Thus, a Horizontalized Meta-Frame Buffer 6240 consisting essentially of eleven line buffers is minimally sufficient to 4×8 interpolate the all the pixels of all rows $R_d$ of the destination frame in raster order with a rotation angle of up to ±45 degrees. Providing fewer than eleven line buffers effectively reduces the maximum rotation angle that can be 4×8 interpolated. On the other hand, providing more than eleven line buffers enables round-robin reuse of line buffers for 4×8 interpolation of a sequence of rows $R_d$ (e.g., based on mapping of a horizontal break line splitting some interpolation windows).

Figure 8:
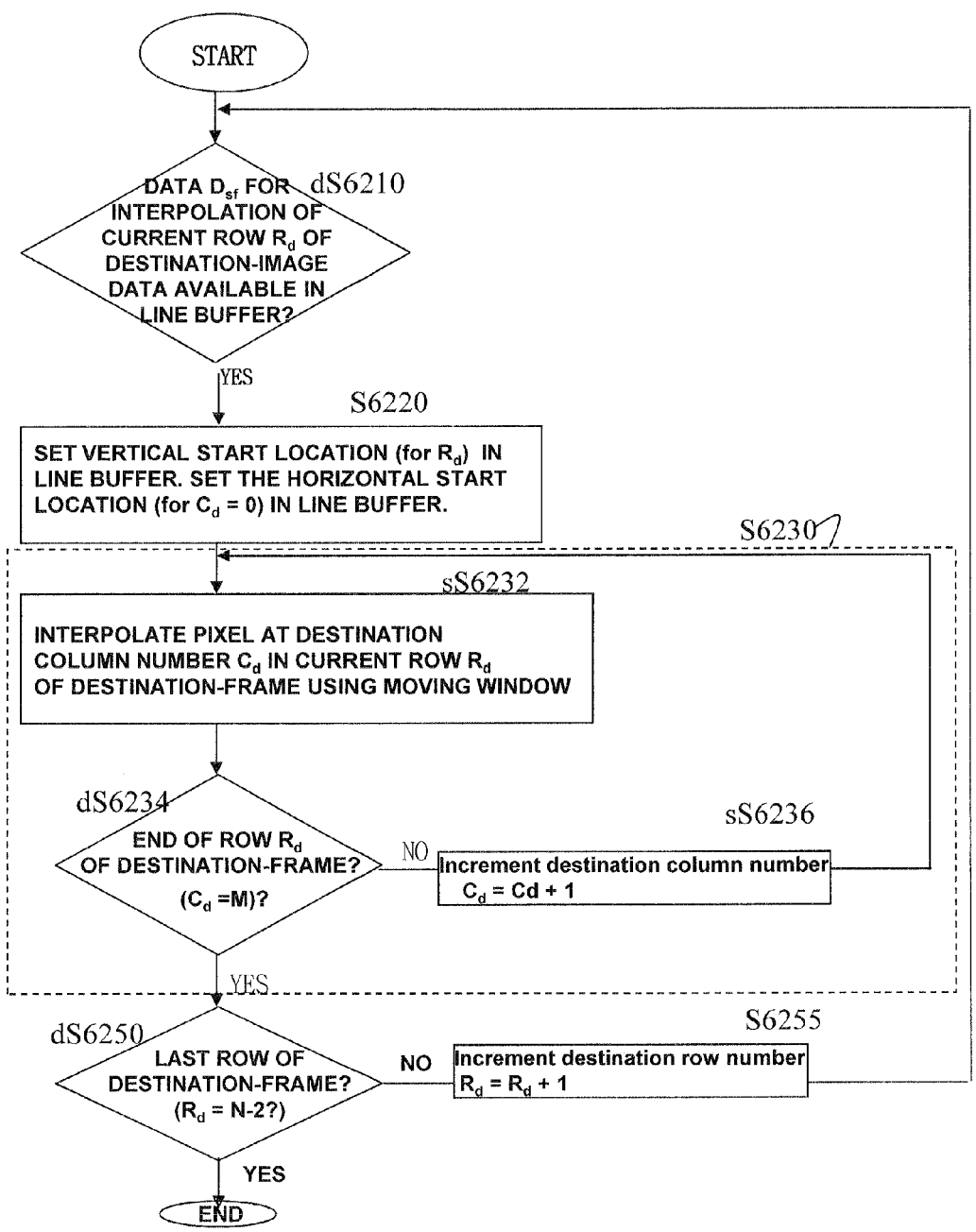
FIG. 8 is flow chart of an exemplary method of sequentially interpolating each pixel of each row of a destination frame by moving-window interpolation from image data in horizontalized meta-rows of the destination meta-frame according to an embodiment of the present inventive concept.

FIG. 8 is flow chart of an exemplary method of sequentially interpolating each pixel of each row $R_d$ of a destination frame by moving-window interpolation from image data $D_{sf}$ in horizontalized meta-rows of the destination meta-frame stored in the meta-frame buffer 6240 of FIG. 2.

In decision step dS6210, it is determined whether sufficient horizontalized source frame data $D_{sf}$ is available in (has been copied into) the horizontalized meta-frame buffer 6240 for interpolation of the currently selected destination frame row $R_d$ to proceed. If sufficient horizontalized source frame data $D_{sf}$ is available (YES branch of decision step dS6210), then the interpolation of the currently selected row $R_d$ of the destination frame begins with identifying the vertical position and horizontal position of the required source frame data $D_{sf}$ located in the line buffers of the horizontalized meta-frame buffer 6240. A vertical start location for interpolation of the current row $R_d$ depends upon the angle of rotation and is calculated in step S6220. Similarly, a horizontal start location for interpolation of the first pixel (first column $C_d$=0) in the current row $R_d$ of the destination frame depends upon the angle of rotation and is also calculated in step S6220.

In step S6230 a method of interpolation of all pixels of the currently selected row $R_d$ of destination-frame is performed and the interpolated destination frame data $D_{df}$ of the selected row $R_d$ is output in raster order. In substep sS6232, the pixel at column $C_d$ and row $R_d$ of the destination frame is interpolated from the horizontalized image data $D_{sf}$ stored in the line buffers (e.g., using a 4×4 pixel or 4×8 pixel interpolation window). In decision step dS6234, it is determined whether the pixel in the last column ($C_d$=M) of the currently selected row $R_d$ of the destination frame has been interpolated. If the last pixel ($C_d$=M) of the currently selected row $R_d$ has not been interpolated, (NO branch of decision step dS6234), then the column index is incremented ($C_d$=$C_d$+1), and interpolation substep sS6232 is repeated on the next pixel in the currently selected row $R_d$ of the destination frame. If the last pixel ($C_d$=M) of the currently selected row $R_d$ has been interpolated, (YES branch of decision step dS6234), then decision step dS6250 is next performed to determine whether the last row ($R_d$=N) of the destination frame has been interpolated.

If the last row ($R_d$=N) of the destination frame has not been interpolated, (YES branch of decision step dS6234), then the row index is incremented ($R_d$=$R_d$+1), and the execution of decision step dS6210 is repeated for the next row $R_d$ of the destination frame. If the last row ($R_d$=N) of the destination frame has been interpolated, (YES branch of decision step dS6234), then the destination frame has been entirely interpolated and all the destination frame data $D_{df}$ has been output in raster order.

Figure 9:
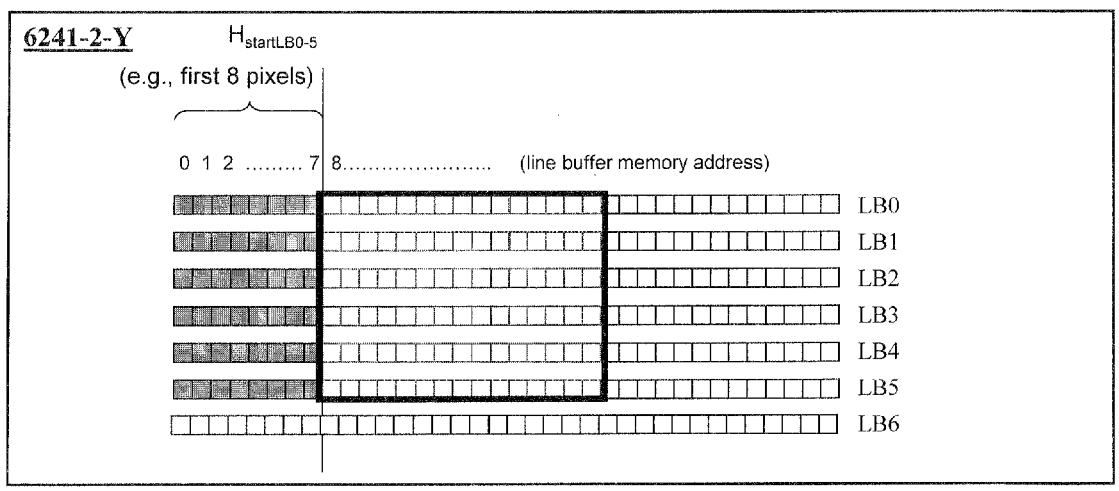
FIG. 9 is a block diagram of an exemplary implementation of a luma Y meta-frame buffer illustrating source frame data $D_{sf}$ alignment and start positions for interpolation.

FIG. 9 is a memory map of an exemplary implementation 6241-2-Y of the luma Y meta-frame buffer 6241-Y in the horizontalized meta-frame buffer 6240 in FIG. 2, illustrating source frame data $D_{sf}$ alignment and start positions for interpolation. An 7-line buffer 6241-Y is provided in this exemplary implementation to perform the steps of the method of FIG. 8B. Single port SRAM may be used for each line buffer (LB0 through LB6). Seven line buffers can be read simultaneously during the process of interpolation of the destination frame row $R_d$ meanwhile one or more additional line-buffers (not shown) may be written with the source frame data $D_{sf}$ required for interpolation of the next destination frame row $R_{d+1}$. A 4×8/4×4 window area of source frame data $D_{sf}$ is required for interpolation operation of each pixel of the destination frame. Because of the rotation characteristic, the required source frame data $D_{sf}$ needed to interpolate one destination frame row $R_d$ may span more than 4 line buffers containing the source frame data (see diagrams of 4×4 pixel interpolation windows in FIG. 4 and see diagrams of 4×8 pixel interpolation areas in FIGS. 13 & 14). Thus multiple (e.g., seven) line buffers are provided to support the interpolation window operation. The 8-bit 4:2:2 (single plane, YC data in interleave format) data format is supported by an exemplary implementation up to a rotation angle of ±22.5 degrees, which may be a sufficient angle range for DIS compensation. In alternative embodiments, a 11-line buffer 6241-Y is provided and an 7-line buffer 6241-C is provided, to support a rotation angle up to 45 degrees, in the case of 4:2:2 Chroma subsampling.

The DMA controller 6232 reads the source frame data $D_{sf}$, then writes it into the seven luma Y line-buffers 6241-Y (see 6241-2-Y) and into the seven chroma (C) line-buffers 6241-C. Next, the second Affine Transform Engine 6250 reads a 4×8 pixel window area of the source frame luma Y data (and, in the case of 4:2:2 Chroma subsampling, a 4×4 pixel window area of the source frame Chroma data of the source frame) from line buffers to generate each one pixel of interpolated (e.g., rotated) destination frame, and outputs the pixels of the rotated image (destination frame) in raster order.

Referring again to FIG. 2, in accordance with exemplary implementation 6241-2-Y of FIG. 9, sixteen 1152×17 internal SRAMs (8 for luma Y buffer 6241-Y and 8 for chroma C buffer 6241-C) may be used as line buffers of the meta-frame buffer 6240 to provide the appropriate interpolation window data to support up to HD resolution (1920×1080) of destination output image with a rotation angle of up to ±22.5 degrees. A greater horizontal size of image may be supported by increasing the horizontal line buffer dimension.

In performing the method of FIG. 8B, the first atone transform engine 6220 generates horizontal location information (e.g., read addresses) to control the direct memory access (DMA) controller/Read Master 6232 to fill the first seven line buffers of the luma Y meta-frame buffer 6241-2-Y. The horizontal location information further includes break line position information (e.g., one bit) that is transmitted to the second affine transform engine 6250 for use while interpolating (rotating, scaling) pixels of the destination frame in raster order. The horizontal location information further includes horizontal start position information (e.g.., HstartLB0-5) based on the position of the left end of each meta-row $X_d$ of the destination meta-frame as it is copied within its corresponding line-buffer (e.g., LB0-LB5). For example, the left end of each of the meta-rows $X_d$ of the destination meta-frame stored horizontalized in line buffers LB0 through LB5 may be positioned eight pixels from the left end of its respective line buffer among LB0 through LB5. The rectangle featuring thick dark lines in FIG. 9 depicts a 6×15 pixel region of the destination meta-frame stored horizontalized in line buffers LB0 through LB5, positioned at a horizontal start position (e.g.., HstartLB0-5) eight pixels from the left end of line buffers LB0 through LB5. The image data of the meta-row $X_d$ stored in line buffer LB6 is not aligned with the image data of the meta-rows $X_d$ stored in line buffers LB0 through LB5. Thus, the image data of the meta-row $X_d$ stored in line buffer LB6 starts at a different horizontal line buffer memory address.

Each target source frame data access memory address is calculated by the affine transform equation based on affine coefficients of the principal transform P(n) received via the APB bus. Read DMA channels access the source frame buffer 6230 (or an external DRAM) via the AXI bus master interface, which may be 128-bit data bus width. The DMA/Read Master 6232 on the AXI bus receives instructions (target source frame data access memory addresses) from the first Affine Transform Engine 6220 based on image position and rotation information P(n) received from the APB bus via a APB I/F 6212 and one or more configuration registers 6210.

The first affine transform engine 6220 identifies the locations in the source frame buffer 6230 of the source frame data $D_{sf}$ needed to fill the first seven line buffers LB0 through LB6 of 6241-2-Y in FIG. 9 based on affine parameters sx, sy, rx, ry, tx and ty to generate the corresponding physical memory locations. Four corners of the destination frame (0,0), (0, dst_w), (dst_h,0) and (dst_h,dst_w) labeled in FIG. 3 and affine parameter (sx, sy, rx, ry,tx, ty) are used by the first affine transform engine 6220 to calculate the related source frame data locations (addresses). Due to the distribution of break lines, each meta-row $X_d$ of required source frame data may comprise multiple horizontal starting locations which are calculated based on the position of the first pixel of each meta-row at the destination meta-frame coordinate $X_d[0][y]$ where y is an index of the meta-rows and starts from 0 and increments to the last vertical location [N] of destination meta-frame.

The first affine transform engine 6241 calculates the break-line location information from the affine (rotation) equations:

$$\begin{pmatrix} Xs[m][C] \\ Ys[m][C] \end{pmatrix} = \begin{pmatrix} Sx & Ry \\ Rx & Sy \end{pmatrix} \begin{pmatrix} Xd[m] \\ Yd \end{pmatrix}$$

$$(Xs[0][n]) = \begin{pmatrix} Sx & Ry \\ Rx & Sy \end{pmatrix} \begin{pmatrix} 0 \\ Yd \end{pmatrix} + \begin{pmatrix} Tx \\ Ty \end{pmatrix}$$

$$(Xs[M][n]) = \begin{pmatrix} Sx & Ry \\ Rx & Sy \end{pmatrix} \begin{pmatrix} M \\ Yd \end{pmatrix} + \begin{pmatrix} Tx \\ Ty \end{pmatrix}$$

Where: Yd=C (constant); Xd[m] is from Xd[0]=Xdi (Min.); Xd[m]=Xde. (integer); Xd[m+1]=Xd[m]+1; All the Xs[m][C] and Ys[m][C] are rounded to integer position. X'[I] will be set to Xs[m][C] only when Ys[m][C]≠Ys[m−1][C].

Each required source frame data are accessed from the starting horizontal location (Xs[0][n]) to the ending horizontal location (Xs[M][n]) where Yd is from 0 to M (Max. size of destination frame) and Tx is horizontal offset. (FIG. 3). For each source vertical location calculation with the affine transform, the destination vertical location might advance more than one source frame row. In this case the DMA controller 6232 sets the source vertical location at the (n)th row between the previous (n−1)th row and current (n+1)th row, then sets the (n+1)th row as the next source frame data vertical starting access location.

Figure 12:
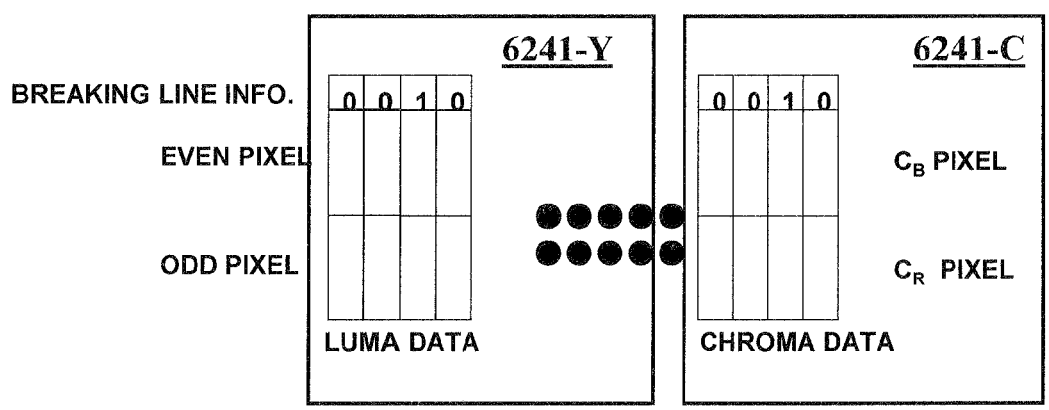
FIG. 12 is a diagram of an exemplary mode of storage of luma Y and Chroma ($C_B$ and CR) source frame data including a line buffer for storing bits indicating the positions of vertical break line locations.

The DMA controller 6232 reads the required source frame data $D_{sf}$ meta-row by meta-row by using the set of breaking line information (source frame vertical line locations) which were calculated based on the destination meta-frame horizontal coordinates $X_d[x][0]$ where x is an index of column location of pixels in the meta-rows and starts from 0 and increments to last horizontal pixel [M] of the row of destination frame. Each meta-row read by the DMA controller 6232 is copied into one line-buffer of the luma Y meta-frame buffer 6241-2-Y of FIG. 9. Since the horizontal locations of break lines in the source frame is also aligned vertically in all the line buffers, the breaking line information will also be stored (as one bit data as shown in FIG. 12) and used to define the interpolation window shape during the interpolation process performed by the second affine transform engine 6250. The X'[I] indicates the vertical location changed (increment or decrement depends on the rotation direction). While the DMA controller 6232 accesses and stores the required source frame data in the line buffer aligned with the horizontal row of the destination frame the following location (address) information is saved and made available to the second affine transform engine 6250 during the source frame read process:

Horizontal starting location;
Vertical starting location;
AXI read transaction starting and ending location.

The preferred data bus width of the AXI data bus in the current exemplary implementation is 128 bits (RDATA=WDATA=128 bits). Thus each AXI read request transaction represents the breaking line location information that needs to be saved as well not only so that the second interpolation engine 6250 knows to select the right shape interpolation window data but also to discard the redundant data if the starting or ending location of the AXI read data is not 128-bit aligned. Preferably, each valid requested source frame data within one AXI read transaction starts from the even pixel location of luma Y data to avoid getting the mismatching chroma Cb, Cr data at the same horizontal location between the breaking line position during the interpolation.

The criterions of requested the AXI read transaction (e.g. step_____of FIG. S6130-B) depends on the following conditions:

Affine transform hit the breaking line condition and the pixel distance is more than 7-pixel from the last breaking line location except the first request of each line;

Aligned breaking location regarding to the previous line; and

The consecutive required source frame data count is reached the maximum AXI burst transaction length during the process of above two conditions.

Figure 10:
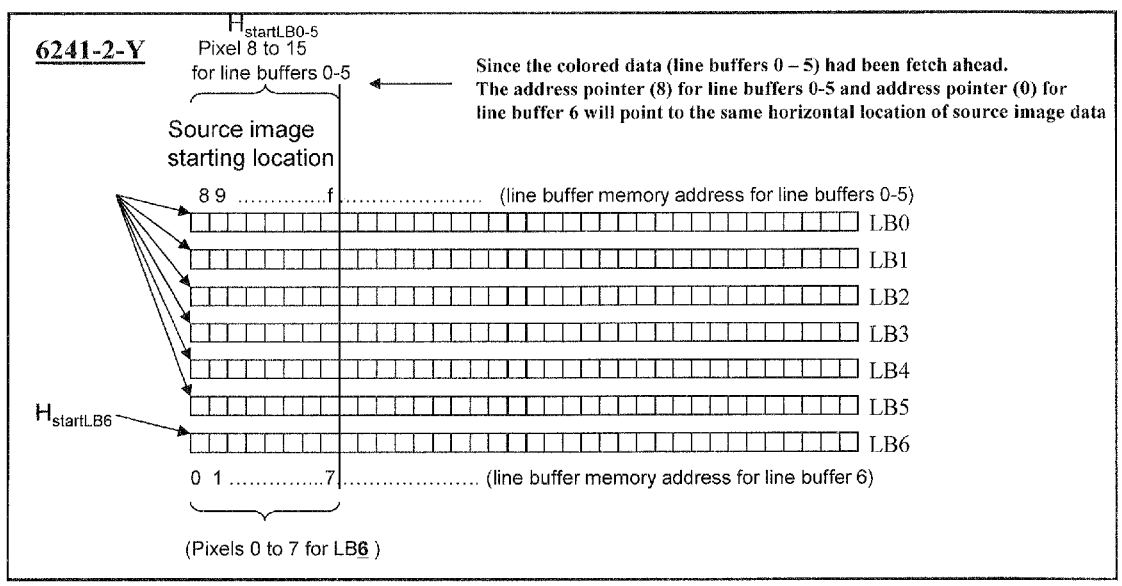
FIG. 10 is a diagram illustrating implementation of a luma Y meta-frame buffer and variations in the horizontal starting position of moving-window interpolation of meta-rows according to an embodiment of the present inventive concept.

FIG. 10 is a memory map of the exemplary implementation 6241-2-Y of FIG. 9 illustrating variations in the horizontal starting position of moving-window interpolation of meta-rows stored in the meta-frame line-buffer 6241-2-Y to perform the steps of the method of FIG. 8B.

In performing the method of FIG. 8B, the first affine transform engine 6220 generates horizontal location information (e.g., read addresses) to control the direct memory access (DMA) controller/Read Master 6232 to fill the first seven line buffers LB0-LB6 of the luma Y meta-frame buffer 6241-2-Y. The horizontal location information includes horizontal start position information (e.g., HstartLB0-5) based on the position of the left end of each meta-row $X_d$ of the destination meta-frame as it is copied within its corresponding line-buffer (e.g., LB0-LB5). For example, the left end of each of the meta-rows $X_d$ of the destination meta-frame stored horizontalized in line buffers LB0 through LB5 is positioned sixteen pixels (HstartLB0-5=16) from the left end of its respective line buffer among LB0 through LB5. Meanwhile, the left end of the meta-row $X_d$ of the destination meta-frame stored horizontalized in line buffer LB6 is be positioned eight pixels (HstartLB6=8) from the left end of its respective line buffer LB6. The image data stored in line buffers LB0 through LB5 has been fetched ahead. The horizontal address pointer is eight for line buffers LB0 through LB5 and the horizontal address pointer is zero for line buffer LB6 but point to the same horizontal location of source image data. Thus, the image data of the meta-row $X_d$ stored in line buffer LB6 starts at a different horizontal line buffer memory address.

Figure 11:
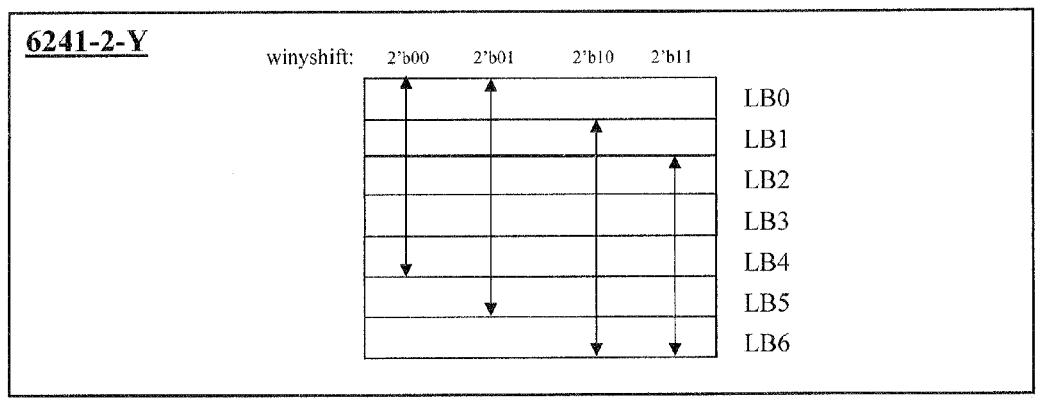
FIG. 11 is a block diagram of an exemplary line-buffer implementation of a luma Y meta-frame buffer illustrating variations in the vertical starting position (winyshift) of moving-window interpolation of meta-rows according to an embodiment of the present inventive concept.

FIG. 11 is a diagram of the exemplary line-buffer implementation 6241-2-Y of FIG. 9 illustrating variations in the vertical starting position winyshift of moving-window interpolation of meta-rows stored in the meta-frame line-buffer 6241-2-Y. There are two bit internal signals in a preferred implementation of the DIS Compensation Unit 6000 of FIG. 2 in the DIS circuit of FIG. 1 performing the method of FIG. 8B for indicating the vertical location of the interpolation during the moving window interpolation process of each row $R_d$ of the destination frame. The center of line buffer location of the interpolation window (x',y') changes depending upon breaking line indicator. Table 1 shows the meaning of two bit internal signals Table 1 line buffer vertical window range select command (winyshift) WIN YSHIFT[1:0]

00 center of line buffer location is the same as process location 01 center of line buffer location is larger than one of process location 10 center of line buffer location is smaller than one of process location 11 center of line buffer location is smaller than two of process location As shown by the arrow-terminated lines in FIG. 11, different sets of line buffers LB0 through LB6 correspond to the four different winyshift commands.

There are three types of line buffer vertical direction action to indicate the next center line location. If current center line is n, 1. Increment—advance to next vertical source frame line. (n+1)
2. Repeat line—stay at the same vertical source frame line (n)
3. Skip line—advance two vertical source frame line (n+2)

Table 2 characterizes the action concerning the vertical direction movement of the interpolation window center in the line buffers:

| Action | Condition |
| --- | --- |
| Repeat line | Whenever the top line buffer had been used and it will not be used again for sure |
| Skip line | Whenever the winyshift = 2'b11 |
| Increment | Other than above two conditions |

FIG. 12 is a diagram of an exemplary mode of storage of luma Y and Chroma ($C_B$ and CR) source frame data stored in the meta-frame line-buffer 6240 of FIG. 2 including with a line buffer for storing bits indicating the positions of vertical break line locations. The source image data (luma Y data and chroma Cb, Cr data) and breaking line information bits are stored in the line buffer is shown in FIG. 12. The bits indicating the positions of vertical break line locations comprise one bit her horizontal position, indicting the presence or absence of a line break.

Figure 13:
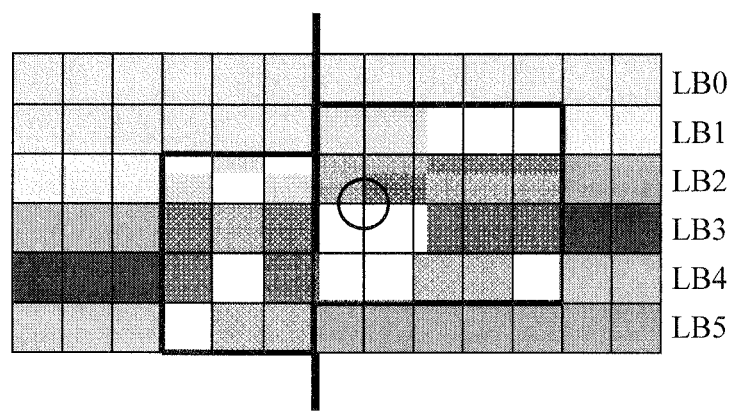
FIG. 13 is a diagram illustrating the shape of an exemplary 4×8 pixel interpolation window split due to clockwise rotation of the destination frame by one vertical break line.
Figure 14:
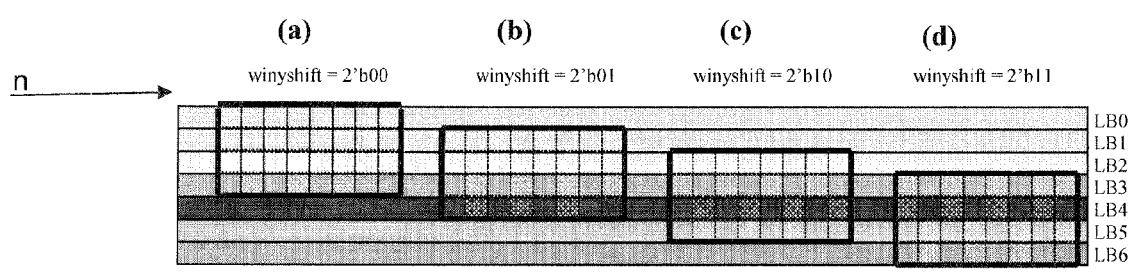
FIG. 14(a) to (d) illustrates the shape and vertical positions of exemplary non-split 4×8 pixel moving-windows for interpolating pixels in different rows of a non-rotated destination frame of source frame data according to an embodiment of the present inventive concept.
Figure 15:
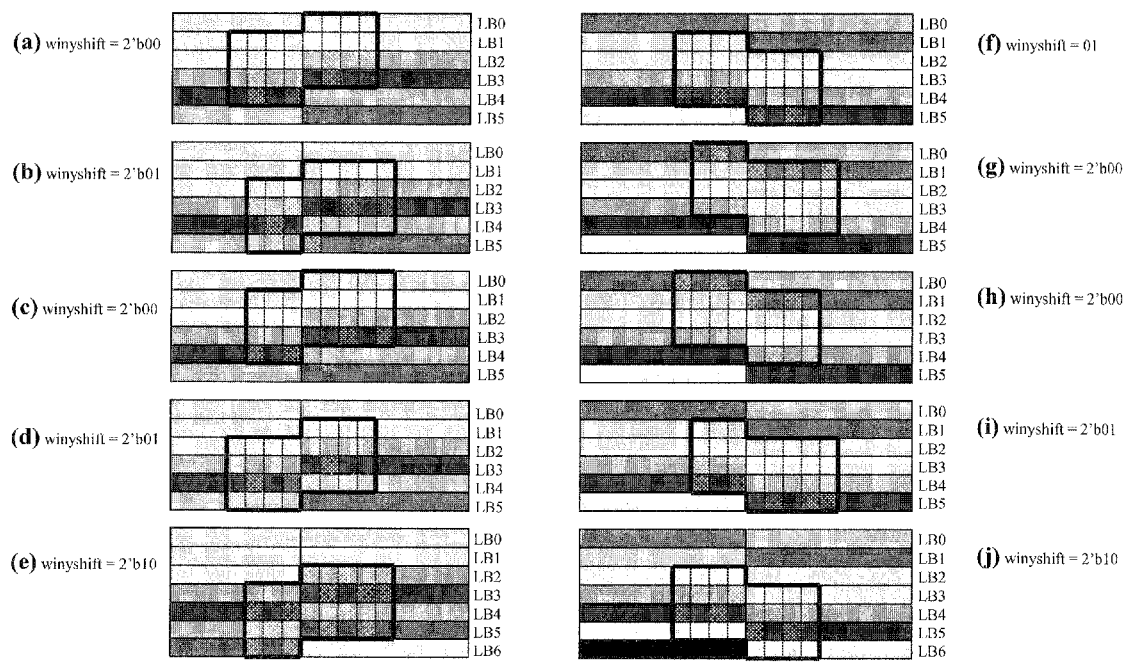
FIGS. 15(a) to 15(e) are diagrams illustrating the shape and positions of exemplary split 4×8 pixel moving-windows for interpolating different pixels of a first clockwise-rotated destination frame from source frame data according to an embodiment of the present inventive concept.
FIGS. 15(f) to 15(j) are diagrams illustrating the shape and positions of exemplary split 4×8 pixel moving-windows for interpolating different pixels of a second counter-clockwise rotated destination frame from source frame data according to an embodiment of the present inventive concept.

FIG. 13 is a diagram illustrating the shape of an exemplary 4×8 pixel interpolation window split (due to clockwise rotation of the destination frame relative to the source frame) by one vertical break line in the horizontalized meta-frame buffer 6240 in FIG. 2. The circle denotes the mathematical center of the 4×8 pixel interpolation window prior to horizontalization, and the approximate location of the pixel of the destination frame to be interpolated therefrom.

FIGS. 14(a) to 14(b) are diagrams illustrating the regular rectangular shape and the vertical positions of exemplary non-split 4×8 pixel interpolation windows for interpolating pixels in different rows $R_d$ of a destination frame. FIGS. 14(a) to 14(b) illustrate different values of the vertical starting position winyshift of moving-window interpolation of meta-rows stored in a seven-line horizontalized meta-frame line-buffer. The destination frame pixels are interpolated from source frame data $D_{sf}$ contained in four horizontal meta-rows of the destination meta-frame stored four line buffers in the horizontalized meta-frame buffer 6240 in FIG. 2. The value of each vertical starting position winyshift is also indicated.

FIGS. 15(a) to 15(e) are diagrams illustrating the shape and positions of exemplary split 4×8 pixel moving-windows for interpolating different pixels of a first clockwise-rotated destination frame from source frame data $D_{sf}$ contained in horizontal meta-rows of the destination meta-frame stored in the horizontalized meta-frame buffer 6240 in FIG. 2. FIGS. 15(a) to 15(e) are diagram illustrating the shape of an exemplary 4×8 pixel interpolation window split due to clockwise rotation of the destination frame relative to the source frame by one vertical break line in the horizontalized meta-frame buffer 6240 in FIG. 2. The value of each vertical starting position winyshift is also indicated.

FIGS. 15(f) to 15(j) are diagrams illustrating the shape and positions of exemplary split 4×8 pixel moving-windows for interpolating different pixels of a second counter-clockwise rotated destination frame from source frame data $D_{sf}$ contained in horizontal meta-rows of the destination meta-frame stored in the horizontalized meta-frame buffer 6240 in FIG. 2. FIGS. 15(f) to 15(j) are diagram illustrating the shape of an exemplary 4×8 pixel interpolation window split due to clockwise rotation of the destination frame relative to the source frame by one vertical break line in the horizontalized meta-frame buffer 6240 in FIG. 2.

In each of FIGS. 14(a) through 14(d) and FIGS. 15(a) through 15(j), there is at most one breaking line within each 4×8 interpolation window area. This limitation as a design choice reduces the implementation complexity, because only one line breaking will occur within a 4×8 interpolation window area, but reduces the range of rotation angles that can be interpolated. The correct source frame data should be collected based on the breaking line marking points. Each row of interpolation source frame data should come from same source frame line. The second affine transform engine determines the interpolation window position (shape) by comparing the output coordinates information with the coordination information that was calculated by the first affine transform engine and stored in some internal FIFOs and line buffers.

Exemplary embodiments of the present invention reduce the overhead of source frame data access, and generates the raster order scan type of output destination frame data. The raster scan order of the output destination frame data is facilitated by the re-alignment arrangement of diagonally distributed source frame data into multiple line buffers.

Utilization of the embodiments of the present inventive concept reduces overhead because the same source frame data is read only once as compared to overlapping reading of source frame data in tiling method, and also generates the raster order destination frame data output sequence smoothly without further computational or memory overhead.

The above-disclosed subject matter is to be considered illustrative, and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. An image processing circuit, comprising:
   a first affine transform engine configured to generate a set of horizontal location data indicating the start of each meta-row of pixels in a source frame and corresponding to pixels in rows of a destination frame;
   a memory access controller controlled based on the horizontal location data to read each meta-row of pixels from the destination frame and to write each meta-row of pixels horizontalized into one of a plurality of line buffers; and
   a second affine transform engine adapted to interpolate and output each pixel in each row of pixels of the destination frame in raster order from a plurality of the horizontalized meta-rows of pixels of the source frame stored in the plurality of line buffers.

2. The circuit of claim 1, wherein the destination frame is rotated during the interpolation of the pixels of the destination frame according to a received set of affine transform coefficients.

3. The circuit of claim 1, wherein the first affine transform engine generate the set of horizontal location data indicating the start of each meta-row of pixels in the source frame based on a received set of affine transform coefficients and based on position and dimension information relating the destination frame to the source frame.

4. The circuit of claim 1, wherein the plurality of line buffers comprises at least five line buffers.

5. The circuit of claim 1, wherein the plurality of line buffers comprises at least seven line buffers.

6. The circuit of claim 1, wherein the plurality of line buffers comprises at least eleven line butlers.

7. The circuit of claim 6, wherein the second affine transform engine interpolates and outputs each pixel in each row of pixels of the destination frame in raster order from using a 4×8 pixel interpolation window spanning each of the eleven line buffers.

8. An image processing circuit comprising:
   a first transform engine configured to generate a set of horizontal location data indicating start and end of each meta-row of pixels in a rotated destination frame portion of an original image frame;
   a direct memory access controller configured to read each meta-row of pixels in a destination frame portion and to write each row into one of a plurality of line buffers; and
   a second transform engine configured to interpolate each pixel of the rotated destination frame and to output the pixels in raster order;
   wherein the destination frame is rotated during the interpolation of the pixels of the destination frame according to a received set of affine transform coefficients,
   wherein the first transform engine generates the set of horizontal location data indicating the start of each meta-row of pixels in a source frame based on the received set of affine transform coefficients and based on position and dimension information relating the destination frame to the source frame.

9. The circuit of claim 8, wherein the plurality of line buffers comprises at least five line buffers.

10. The circuit of claim 8, wherein the plurality of line buffers comprises at least seven line buffers.

11. The circuit of claim 8, wherein the plurality of line buffers comprises at least eleven line buffers.

12. The circuit of claim 11, wherein the second affine transform engine interpolates and outputs each pixel in each row of pixels of the destination frame in raster order from using a 4×8 pixel interpolation window spanning each of the eleven line buffers.

13. An image processing circuit comprising:
   a direct memory access controller configured to read each meta-row of pixels in a rotated destination frame portion of an original image frame based on generating a set of horizontal locations indicating the start and end of each meta-row of pixels in the destination frame portion, and configured to write each meta-row into one line of a buffer; and
   a second transform engine configured to interpolate each pixel of the rotated destination frame in each one line of the buffer and to output the interpolated pixels in raster order.

14. The circuit of claim 13, further comprising:
   a first affine transform engine configured to generate the set of horizontal location data indicating the start of each meta-row of pixels in the source frame based on a received set of affine transform coefficients and based on position and dimension information relating the destination frame to the source frame.

15. The circuit of claim 14, wherein the second transform engine rotates the destination frame during raster-order interpolation of the pixels of the destination frame stored in the buffer, according to a received set of affine transform coefficients.

* * * * *